United States Patent
Gong et al.

(10) Patent No.: US 7,208,541 B2
(45) Date of Patent: Apr. 24, 2007

(54) HOT MELT ADHESIVE

(75) Inventors: Lie-zhong Gong, Bridgewater, NJ (US); Melissa L. Allen, Hillsborough, NJ (US); Justin A. Mehaffy, Hampton, NJ (US); Darshak R. Desai, Woodbridge, NJ (US); Dale L. Haner, Ringwood, NJ (US); Tuyet Le, Edison, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 138 days.

(21) Appl. No.: 10/646,417

(22) Filed: Aug. 22, 2003

(65) Prior Publication Data

US 2005/0042469 A1 Feb. 24, 2005

(51) Int. Cl.
 *C08K 5/01* (2006.01)
(52) U.S. Cl. .................. 524/487; 524/499; 525/74; 525/207; 525/222; 526/935

(58) Field of Classification Search ............... 526/935; 524/487, 499, 271–272; 525/74, 207, 222
See application file for complete search history.

(56) References Cited

U.S. PATENT DOCUMENTS

| 5,252,393 | A | * | 10/1993 | Kagota et al. | ............... 428/349 |
|---|---|---|---|---|---|
| 6,271,306 | B1 | * | 8/2001 | Rodriguez et al. | ........... 524/845 |
| 6,297,309 | B1 | * | 10/2001 | Bauduin et al. | ............ 524/476 |
| 6,552,110 | B1 | * | 4/2003 | Yalvac et al. | ............... 524/274 |
| 2001/0034386 | A1 | | 10/2001 | Kempthorn et al. | |
| 2004/0122143 | A1 | * | 6/2004 | Radigon et al. | ............ 524/272 |
| 2004/0198897 | A1 | * | 10/2004 | Domine et al. | ............. 524/560 |
| 2005/0003197 | A1 | * | 1/2005 | Good et al. | .............. 428/411.1 |
| 2005/0064180 | A1 | * | 3/2005 | Daily et al. | ................. 428/343 |

FOREIGN PATENT DOCUMENTS

FR 2819821 * 7/2002

OTHER PUBLICATIONS

Anonymous,"Lotryl EH: Fluidity and Themal Stability". ATOFINA, (May 5, 2002) www.atofina.com.

* cited by examiner

*Primary Examiner*—Peter Szekely
(74) *Attorney, Agent, or Firm*—Sun Hee Lehmann; Cynthia L. Foulke

(57) ABSTRACT

A hot melt adhesive based on ethylene-2-ethylhexyl acrylate copolymer finds use in packaging applications where high heat resistance, as well as good cold tolerance, is required.

18 Claims, No Drawings

HOT MELT ADHESIVE

FIELD OF THE INVENTION

The invention relates to a hot melt adhesives that exhibit an excellent balance of high and low temperature performance and are particularly advantageous for use in packaging applications.

BACKGROUND OF THE INVENTION

Hot melt adhesives are widely used in the packaging industry to seal cardboard cases, trays and cartons.

Many types of packaging applications require the use of an adhesive that is both heat resistant and cold tolerant. The use of a hot melt adhesive with exceptionally high heat resistance and, in addition, good cold resistance is important in hot filled packaging applications, e.g., sealing and closing operations for cartons, cases or trays used for packaging molten cheese, yogurt or freshly baked goods, which are subsequently subjected to refrigeration or freezing. An adhesive having good heat resistance and good cold resistance is also needed to seal containers (cases, cartons, and the like) that are to be shipped by truck or railway. Sealed containers being transported and/or stored within a truck or rail car are exposed to very high temperatures in the summer (up to 165° F. or higher) and very low temperatures in the winter (down to about −20° F. or lower). Thus, hot melt adhesives used in packaging applications need to be strong enough such that the sealed containers will not pop open during the transportation process.

While hot melt adhesives based on ethylene vinyl acetate and/or ethylene n-butyl acrylate having been used in packaging applications, there continues to be a need for new and improved hot melts formulations, including formulations based on new polymers, that possess both high heat resistance and good cold adhesion. The current invention addresses this need.

SUMMARY OF THE INVENTION

The invention provides a hot melt adhesive having both good heat and cold resistance, methods of using the adhesive to bond substrates together, to close/seal cases and cartons and the like, and to articles of manufacture comprising the adhesive.

One aspect of the invention provides hot melt adhesives comprising an ethylene-2-ethylhexyl acrylate copolymer. Preferred adhesive formulations also comprise a functionalized polyethylene additive, a tackifier and a wax.

Another aspect of the invention is directed to hot melt adhesives that can be applied at about 300° F. or less and that have high heat resistance. The invention provides the art with low application temperature hot melt adhesives having heat stress values above about 150° F., more preferably above about 155° F. Encompassed are low application temperature hot melt adhesives comprising ethylene-2-ethylhexyl acrylate copolymer and, preferably, also a functionalized polyethylene additive, a tackifier and a wax.

Still another aspect of the invention is directed to a method of sealing and/or making or forming a case, a carton, a tray, a box or a bag. The method comprises use a hot melt adhesive wherein the adhesive comprises ethylene-2-ethylhexyl acrylate copolymer.

Yet another aspect of the invention is directed to an article of manufacture comprising a hot melt adhesive comprising ethylene-2-ethylhexyl acrylate copolymer. In one embodiment, the article of manufacture is a carton, case, tray or bag used for packaging products, said carton, case, tray or bag formed using a hot melt adhesive comprising ethylene-2-ethylhexyl acrylate copolymer. The packaged article may comprise cardboard or paperboard that has been adhered by such hot melt adhesives. In another embodiment, the adhesive is pre-applied to the article, e.g., carton, case, tray or bag during the manufacture thereof, and prior to packaging of a product.

A further aspect of the invention is directed to packaged articles contained within a carton, case, tray or bag, in particular packaged food, wherein the carton, case, tray or bag comprises ethylene-2-ethylhexyl acrylate copolymer.

The invention also provides a process for bonding a substrate to a similar or dissimilar substrate comprising applying to at least one substrate a molten hot melt adhesive composition and bonding said substrates together, wherein the hot melt adhesive comprises ethylene-2-ethylhexyl acrylate copolymer.

DETAILED DESCRIPTION OF THE INVENTION

All documents cited herein are incorporated in their entireties by reference.

The use of a hot melt adhesive with exceptionally high heat resistance and, in addition, good cold resistance is important in hot filled packaging applications and when packaged goods are transported and/or stored under conditions where exposure to extreme temperatures is likely.

It has been discovered that hot melt adhesives having an excellent balance of high and low temperature performance can be obtained using ethylene-2-ethylhexyl acrylate (EEHA) copolymer. The adhesives of the invention can be formulated to give partial to full fiber tear down to at least about −20° F. and up to about 160° F. or more.

Compared to polymers conventionally used in the manufacture of hot melt adhesives, e.g., ethylene vinyl acetate (EVA) and ethylene n-butyl acrylate (EnBA), EEHA has a lower glass transition temperature (Tg<−50° C.), higher melting point temperature (Tm>70° C.), and less polarity. It as been found that hot melt adhesives based on EEHA have good compatibility with functionalized polyolefin (e.g., maleic modified polyethylene such as Epolene C-18/C-16 from Eastman Chemical and A-C 575A from Honeywell) and have exceptional heat resistance (ability to maintain fiber tear at high temperatures) and good cold tolerance (ability to maintain fiber tear at cold temperatures, i.e., no "pop-ups" at cold temperatures). Preferred adhesive formulations will have heat stress values of at least 100° F., more preferable 120° F. or higher, even more preferable 140° F. or higher, and most preferably higher than 150° F.

The EEHA base polymer used to prepare the adhesives of the invention are commercially available from Atofina Chemical, Philadelphia, Pa. under the tradename Lotryl®EH. Preferred for use are EEHA polymers containing from about 18% to about 45% ethylhexyl acrylate and having a MI of from about 40 to about 1000. The EEHA polymers will typically be used in amounts of from about 5 wt % to about 50 wt %, more preferably from about 5 wt % to about 40 wt %.

Other polymers suitable for use in formulating hot melt adhesives, as are well known to those skilled in the art, may be included in the formulations of the invention. Such polymers include amorphous polyolefins, ethylene-containing polymers and rubbery block copolymers, as well as blends thereof. Random and block copolymers, as well as blends thereof, may be used in the practice of the invention.

In addition to EEHA, the adhesive may preferably also comprise at least one other ethylene copolymer, and may comprise a blend with two or more other polymers. The term ethylene copolymer, as used herein, refers to homopolymers, copolymers and terpolymers of ethylene. Examples of ethylene copolymers include copolymers with one or more polar monomers which can copolymerize with ethylene, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate and mixtures and blends thereof. Other examples include but are not limited to recycled polyethylene terphthalate and polyethylene, ethylene/α-olefin interpolymers, poly-(butene-1-co-ethylene), atactic polypropylene, low density polyethylene, homogenous linear ethylene/α-olefin copolymers, lower melt index n-butyl acrylate copolymers, ethylene vinyl ester copolymers). The desired polar monomer content in the ethylene copolymer is generally from about 1 to about 60 wt %, preferably 15 to 45 wt %, more preferably over 25 wt %. The ethylene copolymer preferably has a melt index of from about 10 to about 5000 grams/10 minutes.

When such additional polymer is present, it is present in amounts of up to about 30 wt %, usually from about 5 to about 25 wt %, preferably up to about 20 wt % and most preferable from about 2 wt % up to about 15 wt %, by weight of the adhesive composition.

Particularly preferred adhesives will comprise a functionalized polyethylene polymer. Commercially available sources of functionalized polyethylene additives are Epolene C-18/C-16, available from Eastman Chemical, and AC575A, available from Honeywell. The inclusion of a functionalized polyethylene in the compositions of the invention lead to improved performance properties. Polyethylene is also, alternatively, considered to be and is referred to in the art as a wax. When referred to as a "functional polyethylene additive" this component constitutes part of the polymer component, and when referred to a polyethylene wax, this component constitutes part of the wax component. A polyethylene wax may or may not be a functionalized polyethylene.

Ethylene n-butyl acrylate and/or an ethylene vinyl acetate copolymers are also preferable used in the compositions of the invention. Ethylene n-butyl acrylate will preferably contain up to about 45% by weight, typically 15 to 35% of n-butyl acrylate and have a melt index of less than about 900, more typically less than about 400. Ethylene vinyl acetate copolymers will typically contain less than about 30% vinyl acetate.

Ethylene n-butyl acrylate copolymers are available from Atofina Chemical, Philadelphia, Pa., under the tradename Lotryl®BA, from Exxon Chemical Co. under the tradename Enable® (e.g., EN33330 which has a melt index of about 330 grams/10 minutes and an n-butyl acrylate content of about 33% by weight in the copolymer and EN33900 which has a melt index of about 900 and an n-butyl acrylate content of about 35% by weight) and from Millennium Petrochemicals under the tradename Enathene® (e.g., EA 89822 which has a melt index of about 400 grams/10 minutes and a n-butyl acrylate content of about 35% by weight in the copolymer).

Ethylene vinyl acetate copolymers are available from DuPont Chemical Co., Wilmington, Del. under the tradename Elvax® (e.g., Elvax® 210 which has a melt index of 400 grams/10 minutes and a vinyl acetate content of 28% by weight in the copolymer, Elvax® 205W which has a melt index of 800 and a vinyl acetate content of about 28% by weight in the copolymer and Elvax® 410 which has a melt index of 500 and a vinyl acetate content of about 18% by weight). Other ethylene vinyl acetate copolymers are available from Exxon Chemical Co. under the tradename Escorene® (e.g., UL 7505) and also from Millennium Petrochemicals, Rolling Meadows, Ill., under the tradename Ultrathene® (e.g., UE 64904) and AT® copolymers available from AT Polymers & Film Co., Charlotte, N.C. (e.g., AT® 1850M).

Ethylene methyl acrylate copolymers are also useful and are available from Exxon Chemical Co. under the tradename Optema® (e.g., Optema® XS 93.04 which has a melt index of about 270 grams/10 minutes and a methyl acrylate content of about 20% by weight in the copolymer).

Other useful polymers include ethylene n-butyl acrylate carbon monoxide copolymers from DuPont under the tradename Elvaloy®, amorphous polyalphaolefin polymers from Rexene Products Co. in Dallas, Tex. under the tradename Rextac®, from Creanova under the tradename Vestoplast®, Exact® 5008, an ethylene-butene polymer; Exxpol® SLP-0394, an ethylene-propylene polymer; Exact® 3031, an ethylene-hexene polymer all available from Exxon Chemical Co.; and Insight® SM-8400, an ethylene-octene polymer available from Dow Chemical Co. Midland, Mich. Ethylene methyl acrylate polymers containing from about 10 to about 28 weight % by weight methyl acrylate and ethylene acrylic acid copolymers having acid numbers of 25 to 150 may also be used in the practice of the invention.

The adhesive compositions of this invention are preferably tackified. The tackifier component will usually be present in an amount of from about 10 wt % to about 60 wt %, more preferably from about 20 wt % to about 50 wt %, even more preferably from about 20 wt % to about 40 wt %. The tackifying resins typically will have Ring and Ball softening points, as determined by ASTM method E28, between about 70° C. and 150° C., more preferably between about 90° C. and 135° C., and most preferably between about 95° C. and 130° C. Mixtures of two or more of the below described tackifying resins may be required for some formulations.

Useful tackifying resins may include any compatible resin or mixtures thereof such as natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Also included are the cyclic or acyclic $C_5$ resins and aromatic modified acyclic or cyclic resins. Examples of commercially available rosins and rosin derivatives that could be used to practice the invention include SYLVALITE RE 110L, SYLVARES RE 115, and SYLVARES RE 104 available from Arizona Chemical; Dertocal 140 from DRT; Limed Rosin No.1, GB-120, and Pencel C from Arakawa Chemical. Examples of commercially available phenolic modified terpene resins are Sylvares TP 2040 HM and Sylvares TP 300, both available from Arizona Chemical.

Preferred tackifiers are synthetic hydrocarbon resins. Included are aliphatic or cycloaliphatic hydrocarbons, aromatic hydrocarbons, aromatically modified aliphatic or cycloalipatic hydrocarbons and mixtures thereof.

Non-limiting examples include aliphatic olefin derived resins such as those available from Goodyear under the Wingtack® Extra tradename and the Escorez® 1300 series from Exxon. A common $C_5$ tackifying resin in this class is a diene-olefin copolymer of piperylene and 2-methyl-2-butene having a softening point of about 95° C. This resin is available commercially under the tradename Wingtack 95. Eastotac H115 (available from Eastman Chemical), a hydrogenated cyclopentadiene-bases tackifier with a softening point of 115° C. is a particularly preferred tackifier.

Also useful are aromatic hydrocarbon resins that are $C_9$ aromatic/aliphatic olefin-derived and available from Startomer and Cray Valley under the trade name Norsolene and from Rutgers series of TK aromatic hydrocarbon resins. Norsolene M1090 is a low molecular weight thermoplastic hydrocarbon polymer having a Ring and Ball softening point of 95–105° C. and is commercially available from Cray Valley.

Small quantities of alkyl phenolic tackifiers can be blended with additional tackifier agents detailed above to improve the high temperature performance of these adhesives. Alkyl phenolics added in less than 20 wt % of the total formulation are compatible and in the proper combination increase high temperature adhesive performance. Alkyl phenolics are commercially available from Arakawa Chemical under the Tamanol tradename and in several product lines from Schenectady International.

Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, including vinyl acetate modified waxes such as AC400 (Honeywell) and MC400 (available from Marcus Oil Company), maleic anhydride modified waxes such as Epolene C-18 (available from Eastman Chemical) and AC-575A and AC-575P (available from Honeywell) and oxidized waxes are particularly preferred for use in the practice of the invention. Paraflint®C-80 and Paraflint®H-1, H4 and H-8, Fischer-Tropsch waxes available from Sasol-SA/Moore&Munger, Shelton, CN are also preferred waxes for use in the practice of the invention.

Paraffin waxes that can be used in the practice of the invention include Okerine® 236 TP available from Astor Wax Corporation, Doraville, Ga.; Penreco® 4913 available from Pennzoil Products Co., Houston, Tex.; R-7152 Paraffin Wax available from Moore & Munger, Shelton, Conn.; and Paraffin Wax 1297 available from International Waxes, Ltd. in Ontario, Canada, Pacemaker available from Citgo, and R-2540 available from Moore and Munger; and other paraffinic waxes such as those available from CP Hall under the product designations 1230, 1236, 1240, 1245, 1246, 1255, 1260, & 1262. CP Hall 1246 paraffinic wax is available from CP Hall (Stow, Ohio).

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Petrolite Corp. located in Tulsa, Okla.; Bareco® ES-796 Amber Wax, a 70° C. melt point wax available from Bareco in Chicago, Ill.; Okerin® 177, an 80° C. melt point wax available from Astor Wax Corp.; Besquare® 175 and 195 Amber Waxes and 80° C. and 90° C. melt point microcrystalline waxes both available from Petrolite Corp. in Tulsa, Okla.; Indramic® 91, a 90° C. melt point wax available from Industrial Raw Materials located in Smethport, Pa.; and Petrowax® 9508 Light, a 90° C. melt point wax available from Petrowax PA, Inc. located in New York, N.Y.

Exemplary high density low molecular weight polyethylene waxes falling within this category include ethylene homopolymers available from Petrolite, Inc. (Tulsa, Okla.) as Polywax™ 500, Polywax™ 1500 and Polywax™ 2000. Polywax™ 2000 has a molecular weight of approximately 2000, an Mw/Mn of approximately 1.0, a density at 16° C. of about 0.97 g/cm$^3$, and a melting point of approximately 126° C. A useful polyethylene wax for use in the practice of the invention is Marcus 300.

Wax will typically be present in the formulations of the invention in amounts of from about 5 to about 60 wt %, more preferable from about 10 to about 45 wt %, and even more preferable from about 15 to about 35 wt %. Preferred waxes have a melt temperature between 120° F., more preferably between 150° F. and 230° F., and most preferable between 180° F. and 220° F.

The adhesives of the present invention preferably also contain a stabilizer or antioxident. These compounds are added to protect the adhesive from degradation caused by reaction with oxygen induced by such things as heat, light, or residual catalyst from the raw materials such as the tackifying resin.

Among the applicable stabilizers or antioxidents included herein are high molecular weight hindered phenols and multifunctional phenols such as sulfur and phosphorus-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

Such antioxidants are commercially available from Ciba-Geigy, Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stanford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

Particularly preferred embodiments of the adhesive of the invention will comprise from about 5 to about 50 wt % EEHA, from about 5 to about 40 wt % of a wax, up to 60 wt % of a tackifier, up to about 20 wt % of a polyethylene, up to about 30 wt % of an EVA copolymer, up to about 30 wt % of an EnBA copolymer and up to about 1 wt % of a antioxidant.

The adhesive compositions of the present invention are prepared by blending the components in the melt at a temperature of above about 120° C., typically at about 150° C. until a homogeneous blend is obtained, usually about two hours is sufficient. Various methods of blending are known in the art and any method that produces a homogeneous blend is satisfactory.

The adhesives may desirably be formulated for application at low temperatures, i.e., formulations that can be applied at temperatures at about 300° F. and down to about 200° F., more typically down to about 250° F.

The hot melt adhesives of the invention find use in packaging, converting, cigarette manufacture, bookbinding, bag ending and in the nonwovens markets. The adhesives find particular use as case, carton, and tray forming, and as sealing adhesives, including heat sealing applications, for example in the packaging of cereals, cracker and beer products. Encompassed by the invention are containers, e.g., cartons, cases, boxes, bags, trays and the like, wherein the adhesive is applied by the manufacturer thereof prior to shipment to the packager. Following packaging, the container is heat sealed.

Adhesives contemplated for pre-application to a substrate surface and then later reactivated to enable the substrate comprising the reactivated adhesive to be bonded to a second substrate may desirably contain an ingredient to facilitate reactivation. Preferred reactivatable adhesives are formulated to reactivate upon exposure to short durations of radiant energy. In this embodiment, the adhesive contains an energy-absorbing ingredient, such as, for example, dyes and pigments, near infrared absorbing dyes and pigments being particularly preferred.

Adhesives can also be formulated for reactivation using ultrasonic energy. Preferred adhesives will reactive upon exposure to ultrasonic energy having a frequency of from about 15 kilohertz to about 40 kilohertz. Substrates to be bonded are brought together with the adhesive sandwiched there between and pressed against an ultrasonic horn with booster.

The hot melt adhesives of the present invention are particularly useful in case sealing applications where exceptionally high heat resistance in addition to cold resistance is important, i.e., in hot filled packaging applications; e.g. sealing and closing operations for cartons, cases, or trays used in packaging molten cheese, yogurt or freshly baked goods which are subsequently subjected to refrigeration or freezing, and for corrugated cases, which are often subjected to high stresses and adverse environmental conditions during shipping and storage.

The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil which is further laminated to film materials such as polyethylene, mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

The following examples are provided for illustrative purposes only. All parts in the formulation are by weight.

EXAMPLES

Example 1

Adhesive Samples A–E were prepared in a single blade mixer heated to 300° F. by mixing the components shown in Table A together until homogeneous.

TABLE 1

|  | Sample A | Sample B | Sample C | Sample D | Sample E |
|---|---|---|---|---|---|
| Irganox 1010 | 0.3 | 0.2 | 0.5 | 0.2 | 0.2 |
| Epolene C-18 | 15 | 15 | 20 | 12 | 15 |
| Paraflint H4 | 21 | 22 |  | 25 | 25 |
| Honeywell A-C 575A |  |  | 10 |  |  |
| Marcus MC-400 | 5 |  |  |  |  |
| Lotryl 35BA320 |  |  | 18 |  |  |
| ELVAX 210W 28% VA, MI = 420 |  | 5 |  |  |  |
| ELVAX 420 18% VA, MI = 150 |  |  |  |  | 10 |
| Lotryl 37EH550 | 25 | 25 | 26 | 8 | 15 |
| Wingtack Extra | 7 | 7 | 6 | 13 | 7 |
| Norsolene A-110 |  |  | 11 |  |  |
| Eastotack H 115 R | 26.7 | 25.8 | 26.5 | 23.8 | 27.8 |
| Total | 100 | 100 | 100 | 100 | 100 |

Example 2

Samples A–E and 34-2100 (a commercially available EnBA hot melt adhesive having good heat stress which is available from National Starch and Chemical Company) were subjected to the tests described below.

Melt viscosities of the hot melt adhesives were determined on a Brookfield Thermosel viscometer using a No. 27 spindle.

Adhesion at 165° F., room temperature, 40° F., 0° F. and −20° F. was determined by applying a ⅛" wide bead of adhesive at 300° F. (or 350° F. for 34-2100) to a 2"×3" piece of double fluted corrugate board, and immediately bringing a second piece of corrugated board into contact to form a bond. A 200 gram weight was immediately placed on the top of the bond for 2 seconds to provide compression. The specimens prepared were conditioned at room temperature for overnight and then placed in oven or refrigerators at different temperatures for 8 hours. The bonds were separated by hand and the resulting fiber tear was recorded.

Heat stress is defined as being the temperature at which a stressed bond fails. Heat stress was measured by forming a composite construction of adhesive (2×½" compressed) between two pieces of corrugated paperboard of specific dimensions. Tests were done in triplicate. The adhesive bead forming this composite is then placed under approximately 300 grams of cantilever stress for 8 hours and 24 hours at 155° F. and 160° F. The test results were recorded as pass (both bonds passed(P)), fail (both bonds failed(F)) or split (one bond passed and the other one failed(S)).

Results of the test described above are shown in Table 2.

TABLE 2

|  | Sample A | Sample B | Sample C | Sample D | Sample E | 34–2100 |
|---|---|---|---|---|---|---|
| Adhesion (% tear) |  |  |  |  |  |  |
| 165° F. | 20, 30 | 1, 5 | 20, 20 | 1, 1 | 1, 1 | 0, 0 |
| Room Temp. | 95, 95 | 90, 95 | 100, 100 | 95, 95 | 95, 90 | 95, 95 |
| 40° F. | 85, 85 | 90, 95 | 80, 85 | 90, 95 | 90, 90 | 80, 85 |
| 0° F. | 85, 65 | 85, 80 | 40, 50 | 90, 75 | 70, 75 | 75, 80 |
| −20° F. | 75, 70 | 85, 90 | 60, 60 | 85, 85 | 65, 75 | 85, 65 |
| Viscosity (cp) |  |  |  |  |  |  |
| @300° F. | 1120 | 1375 | 900 | 1335 | 1190 |  |
| @350° F. |  |  |  |  |  | 875 |
| Heat stress |  |  |  |  |  |  |
| 155° F./8 hours | P | S | P | P | P | F |
| 155° F./24 hours | P | S | F | P | S | F |
| 160° F./8 hours | P | S |  | P | P | F |
| 160° F./24 hours | P | S |  | S | F | F |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A hot melt adhesive comprising an ethyelene-2-ethylhexyl acrylate copolymer and a maleic modified polyethylene.

2. The hot melt adhesive of claim 1 further comprising a tackifier and a wax.

3. The adhesive of claim 1 further comprising an ethylene vinyl acetate copolymer and/or an ethylene n-butyl acrylate copolymer.

4. The adhesive of claim 2 wherein the wax is a polyethylene wax.

5. The adhesive of claim 2 wherein the tackifier is a hydrogenated aliphatic hydrocarbon tackifier.

6. The adhesive of claim 2 comprising from about 5 to about 50 wt % ethylene-2-ethylhexyl acrylate copolymer, from about 5 to about 40 wt % of a wax, from about 5 to about 60 wt % of a tackifier, from about 5 to about 30 wt % of a functionalized polyethylene additive, up to about 30 wt % of an ethylene vinyl acetate copolymer, up to about 30 wt% of an ethylene n-butyl acrylate copolymer and up to about 1 wt % of an antioxidant.

7. The adhesive of claim 6 wherein the wax is a Fischer-Tropsch wax.

8. The adhesive of claim 7 comprising from about 15 to about 35 wt % of a polyethylene wax.

9. The adhesive of claim 1 comprising an ethylene-2-ethylhexyl acrylate copolymer, a maleic modified polyethylene, a hydrogenated aliphatic hydrocarbon tackifier, and a polyethylene wax.

10. The adhesive of claim 9 further comprising an ethylene vinyl acetate copolymer and/or an ethylene n-butyl acrylate copolymer.

11. The adhesive of claim 1 which comprises from about 5 to 25 wt % of said ethylene-2-ethylhexyl acrylate copolymer.

12. The adhesive of claim 11 which comprises from about 5 to 15 wt % of said ethylene-2-ethylhexyl acrylate copolymer.

13. The adhesive of claim 12 which further comprises a tackifier, a wax and an ethylene copolymer selected from the group consisting of ethylene vinyl acetate copolymers and ethylene n-butyl acrylate copolymers.

14. The adhesive of claim 1 which is applied at a temperature of from 300° F. to about 200° F.

15. The adhesive of claim 14 which is applied at a temperature of from 300° F. to about 250° F.

16. The adhesive of claim 14 which has a heat stress value of above about 150° F.

17. The adhesive of claim 14 which gives partial to full fiber tear at temperatures between about −20° F. to about 160° F.

18. The adhesive of claim 14 which further comprises an ethylene n-butyl acrylate copolymer, a tackifier and/or a wax.

* * * * *